Figures 1, 2, 3:
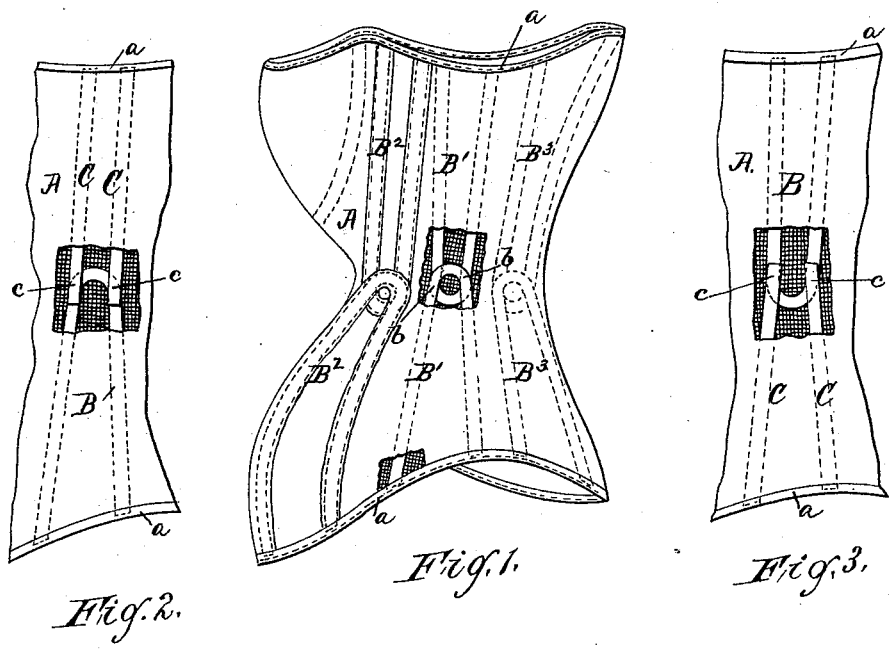

(No Model.)

C. A. GRISWOLD.
CORSET.

No. 392,196. Patented Nov. 6, 1888.

WITNESSES:
C. W. Benjamin
A. T. Fales

INVENTOR,
Catharine A. Griswold,
BY Arden S. Fitch,
ATTORNEY.

UNITED STATES PATENT OFFICE.

CATHARINE A. GRISWOLD, OF NEW YORK, N. Y.

CORSET.

SPECIFICATION forming part of Letters Patent No. 392,196, dated November 6, 1888.

Application filed January 25, 1888. Serial No. 261,844. (No model.)

*To all whom it may concern:*

Be it known that I, CATHARINE A. GRISWOLD, of the city, county, and State of New York, a citizen of the United States, have invented an Improved Corset, of which the following is a full, clear, and exact description, reference being had to the accompanying drawings, forming part of this specification.

My invention relates to corsets; and it consists in a corset provided with stays or stiffeners, each of which has an edgewise turn or reversal of direction, and extends, one or more, from the top or bottom edge of the corset-body to and somewhat beyond the waist-line and with both extremities of each said stiffener terminating at one and the same edge of the corset-body, together with stays or stiffeners extending, one or more, correspondingly from the opposite edge of the corset-body to and somewhat beyond the waist-line, and with the ends thereof thereat overlapping the apices of said corresponding edgewise-bent stiffeners on or along said waist-line, as hereinafter described, and for the purpose specified.

Figure 1 is a side elevation of a corset containing my invention. Fig. 2 is a similar view of a detached portion of a side of a corset, showing a feature of my invention; and Fig. 3 is a similar view of the same, showing a modification thereof.

A represents the corset-body.

At B B, Figs. 2 and 3, are shown steels, bones, stays, or equivalent stiffeners, each of which has in it an edgewise turn or reversal of direction, preferably consisting in a curvated bend about midway of its ends. These edgewise-bent stiffeners extend, one or more, from the top edge of the corset-body, as shown in Fig. 3, downwardly to and somewhat beyond the waist-line or from the bottom edge of the corset-body, as shown in Fig. 2, upwardly to and somewhat beyond the waist-line, the extremities of each stiffener in either case terminating substantially at one and the same edge of the corset-body, as shown.

At C C are represented steels, bones, stays, or stiffeners extending from the edge of the corset-body, which is opposite to that from which the edgewise-bent stiffeners B extend. Said stiffeners C C extend, therefore, from the top or bottom edge, as the case may be, and they are arranged, as shown, one or more, to correspond to each of the described stiffeners B, and they reach from the said edge of the corset-body to and somewhat beyond the waist-line, where their ends thereat, as shown at c, overlap the apices of the corresponding stiffeners, B.

It is preferable, and a feature of my invention, that the stays or stiffeners extending, one or more, as described, from the opposite or top and bottom edges of the corset-body to and somewhat beyond the waist-line, should both or all have in them the edgewise turn or reversal of direction described, as is shown plainly in Fig. 1, and be arranged in correspondence in pairs, as therein shown at B' B', with their apices overlapping each other, as at b, on the waist-line. As shown in the drawings, the extremities of each stiffener terminate at or near and preferably immediately upon one and the same edge of the corset, where they may be inclosed by the binding a.

It is furthermore preferable, and is a feature of my invention, to have the described edgewise-bent stiffeners extend in a series along and from the top edge and in a series along and from the bottom edge, as shown at B' B' B² B² B³ B³, Fig. 1, to and somewhat beyond the waist-line, with each member of one series corresponding to a member of the other series, and with the apices of the corresponding members overlapping one another at and along the waist-line.

The described stiffeners, located, extending to, and overlapping at the waist-line, as set forth, may be seated and incorporated in pockets or folds constituted in and by the material of the corset-body itself by means of stitching passing through the double thicknesses of the corset-body, thereby forming correspondingly-shaped pockets, as shown at B' B'; or the said stiffeners may be secured upon the surface of the corset-body as "overlays," as shown at B² B², overlapping at the waist-line, as herein specified.

It is evident that in a corset constructed in conformity with my invention, as described, the employment of bones or stays extending in or upon the corset continuously from the top to the bottom edges across the waist-line is unnecessary and a fruitful source of discomfort and annoyance to the wearer—namely, the breaking of such stays at the waist-line, which is exceedingly liable to occur, is avoided; and it is further evident that while the described stiffeners overlapping at the waist-line thereby serve the purpose of supporting the person at the waist the liability of the described stiffeners to fracture at or across their lapped ends, due to the extension thereof somewhat past the waist-line, as set forth, is reduced to a minimum, the overlapped ends of the stiffeners serving to support each other and give augmented strength to them flatwise at and around the waist, while at the same time they may have some play endwise upon each other. A corset is thus constituted which has a substantial hingewise joint at and along the waist-line, permitting the free movement of the person of the wearer in bending forward, backward, and sidewise, while the waist is supported and the corset has a desirable increased strength at the waist-line.

I do not claim herein, broadly, a corset having stays which are jointed to each other lengthwise at or about the waist-line, as I am aware that corsets have been heretofore fabricated with stays thus jointed.

What I claim as my invention, and desire to secure by Letters Patent, is—

1. A corset provided with stays, each having an edgewise turn or reversal of direction, and extending, one or more, from the top or bottom edge of the corset-body to and somewhat beyond the waist-line, and with both extremities of each said stiffener terminating at one and the same edge of said corset-body, together with stays extending, one or more, correspondingly from the opposite edge of the corset-body to and somewhat beyond the waist-line, and with the ends thereof thereat overlapping the apices of said corresponding edgewise-bent stiffeners on or along said waist-line, substantially as and for the purpose specified.

2. A corset provided with stays, each of which has an edgewise turn or reversal of direction, and extending, one or more, from the top and bottom edges of the corset-body to and somewhat beyond the waist-line, with the apices of corresponding stiffeners overlapping one another at or along said waist-line, and with both extremities of each said stiffener terminating at one and the same edge of the corset-body, substantially as and for the purpose specified.

3. A corset provided with stays, each having an edgewise turn or reversal of direction, and extending from the top and bottom edges of the corset-body in a series from each to and somewhat beyond the waist-line, with the apices of corresponding members in said series overlapping one another at and along said waist-line, and with both extremities of each said stiffener terminating at one and the same edge of the corset-body, substantially as and for the purpose specified.

CATHARINE A. GRISWOLD.

Witnesses:
   JOHN J. ENNIS,
   JAMES MCINTYRE.